March 19, 1946.                H. J. KERR                2,396,704
         CARBON-MOLYBDENUM STEEL PRODUCT AND METHOD OF MAKING SAME
                          Filed March 11, 1944
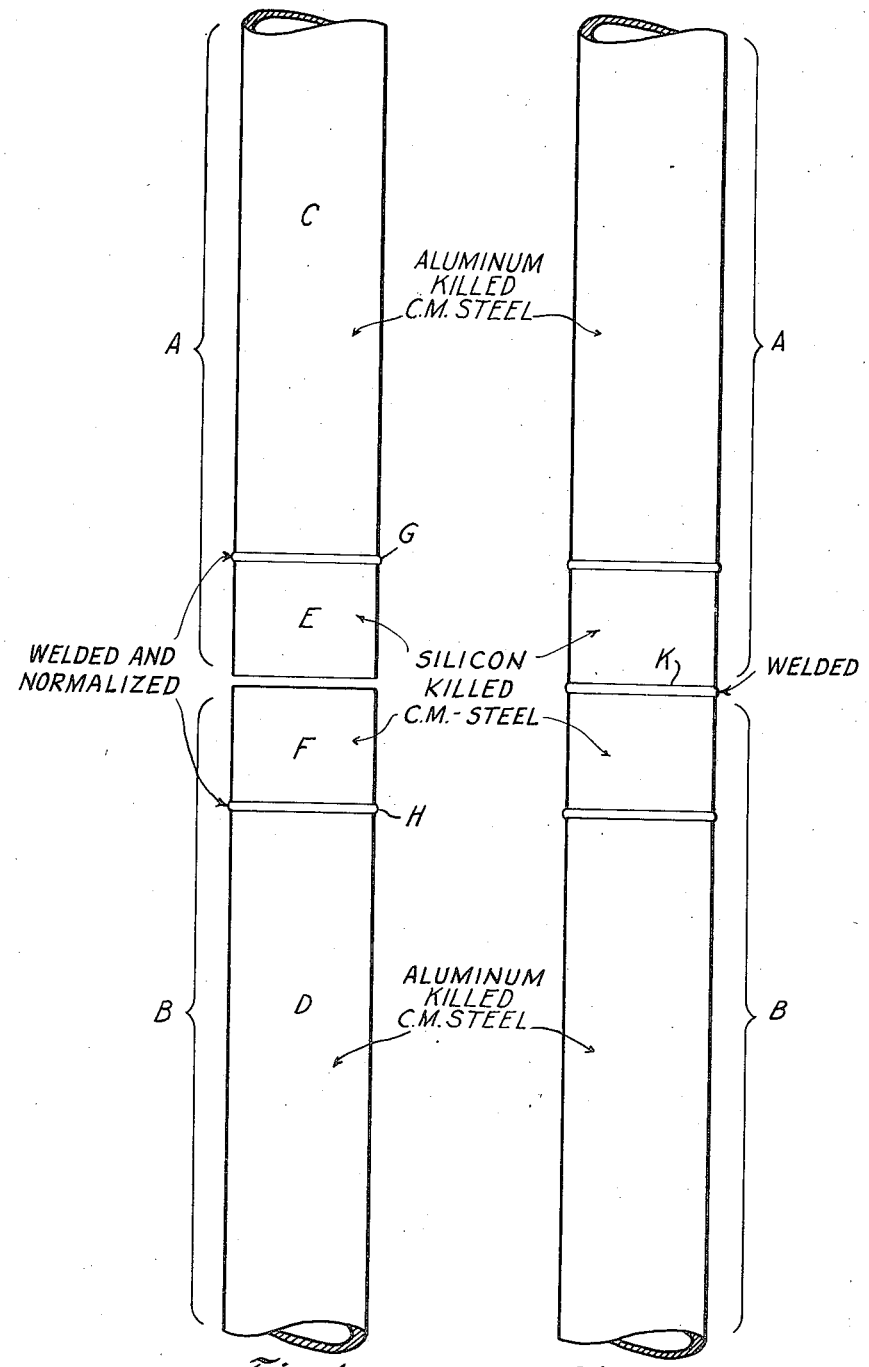
INVENTOR.
Howard J. Kerr
BY
R. M. Holbrook
ATTORNEY Patented Mar. 19, 1946

2,396,704

UNITED STATES PATENT OFFICE 2,396,704

CARBON-MOLYBDENUM STEEL PRODUCT AND METHOD OF MAKING SAME

Howard J. Kerr, Westfield, N. J., assignor to The Babcock & Wilcox Company, Rockleigh, N. J., a corporation of New Jersey Application March 11, 1944, Serial No. 526,054

6 Claims. (Cl. 138—47)

My invention relates to improvements in metallurgy and it is more particularly concerned with improved constructions involving what is known as aluminum killed carbon-molybdenum steel. My invention more specifically relates to the use of aluminum killed carbon-molybdenum steel in metallic constructions such as high temperature and high pressure fluid heat exchange installations which must be erected by welding in the field.

My invention is particularly concerned with what is termed "abnormal" carbon-molybdenum steel. This is a steel which has received in the deoxidation practice a sufficiently large addition of aluminum or of an aluminum alloy so as to produce in the McQuaid-Ehn test a so-called "abnormal" carbide structure. The aluminum content of this steel generally, but not necessarily, is over .015% and in the manufacture of this steel aluminum is the final deoxidizing agent. When tubular components constructed of this steel by welding are used in an installation operating at high temperatures and pressures, microstructural deterioration occurs in that portion of the steel which had been affected by the heat from the welding operation, and this deterioration has been such as to materially decrease the life of large and expensive installations in which the failure of one welded joint would cause substantial material losses, due not only to the cost of repairs, but also to the loss due to the "outage" of the installation while repairs are made.

The microstructural deterioration in the weld-heat-affected zones of "abnormal" carbon-molybdenum steel is the result of the formation of graphite from the decomposition of the carbide in the steel which occurs at service temperatures of about 900° F. to 1000° F. and above. This carbide decomposition takes place in a zone which, during the welding operation, is heated to temperatures in the vicinity of the $A_1$ transformation point of the steel, i. e., approximately 1300° F. to 1400° F., and which follows the contours of the weld metal at a distance from the latter of about $\frac{3}{32}$ in. or more, depending on the welding conditions. In severe cases, the precipitated graphite may form a continuous chain in the microstructure of the affected zone, leading to total embrittlement of the latter and ultimately to failure. This instability of the carbide at temperatures of 900° F. to 1000° F. and above results from the effects of the aluminum addition in the deoxidation practice upon the characteristics of the steel, rendering the latter faster reacting and finding expression in the behavior of the carbide in the McQuaid-Ehn test. The inherent susceptibility to graphitization of the aluminum-deoxidized McQuaid-Ehn abnormal steel can be modified by heat treatment. Thus, I have found that a normalizing treatment, i. e., heating to temperatures above the $A_3$ transformation point (approximately 1650° F. and above) followed by air cooling, effectively retards or entirely prevents the formation of graphite at service temperatures. However, it is often impractical if not impossible to effect such a normalizing heat treatment in all of the welded joints of many large and complicated installations, and if locally applied it would produce again a thermal gradient similar to that adjacent to a weld containing a zone which had been heated to temperatures in the vicinity of the $A_1$ transformation point of the steel, which zone again would be susceptible to graphitization at service temperatures. In the erection of some installations it is possible to effect a stress-relieving heat treatment in which the metal is heated to a temperature of the order of 1200° F., i. e., below the $A_1$ transformation point of the steel, but it is not feasible to subject the metal to a normalizing heat treatment in which the metal is brought to temperatures of 1650° F. and 1700° F.

My invention overcomes these disadvantages by utilizing, in combination with the aluminum-killed carbon-molybdenum steel, McQuaid-Ehn-normal silicon-killed carbon-molybdenum steel, the latter being considered as a steel in which no or only a minimum of aluminum is used in the deoxidation practice so as to result in a "normal" carbide structure in the McQuaid-Ehn test which is recognized as a standard test in A. S. T. M. Standards, 1942, and described on page 750 et. seq. of A. S. M. Metals Handbook, 1939 edition. For example, it may be a steel in which the McQuaid-Ehn grain size is from 1 to 3, and one in which the aluminum content is not over .005 per cent. Under the pertinent conditions of this invention, I have found that such a steel does not substantially graphitize, but it is a steel which is not readily obtainable in large quantities, and it is therefore impractical, and many times impossible to construct all of the pertinent types of welded installations by the use of such steel alone. In contrast, the above-described aluminum-killed carbon-molybdenum steel is readily obtainable in adequate quantities.

My invention overcomes these difficulties by utilizing aluminum killed carbon-molybdenum steel for the main bodies of the metallic components of such installations as high pressure steam generators, and welding to the end portions of these main bodies relatively small bodies of silicon killed carbon-molybdenum steel to form shop fabricated installation components which are given normalizing heat treatment in the shop. These components are then shipped to the site of installation, welded in their operative positions and then heat treated at the welds without such predisposition of parts of the components to graphitization, as would occur (and has occurred) when components wholly constructed of aluminum killed carbon-molybdenum steel have been similarly assembled or erected in the field.

My invention will be described with reference to the accompanying drawing, in which:

Fig. 1 is a partial elevation of two installation components, constructed in accordance with the teachings of this invention, and juxtaposed for field welding; and Fig. 2 is a partial elevation similar to Fig. 1, but indicating the completed construction after the field welding and heat treatment.

In the drawing there are shown two composite tubular component structures A and B. These components may be of considerable length and may be adapted, by their structure, composition, and wall thickness, for successful and long continued operation in fluid heat exchange installations at high temperatures and at high pressures. The predominant parts C and D of the components A and B are of aluminum killed carbon-molybdenum alloy steel. This is a steel which is comparatively readily available, but it is of such composition that it has been found to be subject to graphitization after long continued use under the specified conditions. This graphitization has been particularly evident in the zones of welds joining parts made of this steel. I characterize this steel as aluminum killed carbon-molybdenum steel, and in its deoxidation, aluminum has been used to such an extent that it has shown to be abnormal in the standard McQuaid-Ehn test fully described in the manual of A. S. T. M. Its aluminum content is generally over .015 and its grain size is small, in many cases of the order of 7 or 8.

An analysis of a typical carbon-molybdenum steel such as referred to herein would include:

Carbon _____ .15–.20
Manganese _____ .40–.60
Silicon _____ .15–.25
Molybdenum _____ .45–.6

Such aluminum killed carbon-molybdenum steel may have aluminum content as high as .04.

I provide for the relatively extensive use of aluminum killed carbon-molybdenum steel by welding to the main body portions C and D relatively small end sections of carbon-molybdenum steel which is shown to be normal under the McQuaid-Ehn test. This normal steel has an aluminum content which is usually less than .005. Its aluminum content value is not over that value. Its grain size is from 1 to 3, and it does not graphitize in its weld zones even after long continued use at high temperatures and high pressures of the pertinent installations. However, it is a steel which is not readily obtainable in sufficient quantities, and it is therefore not feasible to construct all large welded fluid heat exchange installations by the use of this steel alone. A typical analysis of such a silicon killed carbon-molybdenum steel would include percentages the same as those above given for an aluminum killed steel except that the aluminum content of the silicon killed steel would not be in excess of .005, whereas, a carbon-molybdenum steel killed with silicon plus aluminum (above referred to as aluminum killed carbon-molybdenum steel) may have an aluminum content of the order of .04.

In carrying out my invention, I preferably weld the relatively small sections of silicon killed molybdenum steel E and F to the ends of the relatively large sections C and D of aluminum killed carbon-molybdenum steel. These welds such as G and H are preferably made in the shop. The welds are X-rayed or otherwise investigated, and when sound are normalized, and then the tubular components are shipped to the site where the complete installation is to be erected. The illustrative tubular components such as A and B are then brought into their operative relationships and the sections E and F of silicon killed carbon-molybdenum steel are united by the formation of the weld K. Such welds may be made under conditions where subsequent normalizing heat treatment is not feasible, but the sections E and F are of such extent that the heat currents in these sections caused by welding do not have such effect upon the welds G and H that they are subject to subsequent graphitization.

Preferably, the welds, such as K, are stress-relieved at a temperature not over 1200° F.

What is claimed is:

1. In a composite tubular product constituting a component of a heat exchange installation operating at high temperatures, a main body portion consisting of an aluminum killed carbon-molybdenum steel of abnormal carbide structure under the McQuaid-Ehn test, and a small end section of a silicon killed carbon-molybdenum steel of normal carbide structure under the McQuaid-Ehn test joined with a marginal portion of said main body portion by a weld, said weld and the main body portion being of normalized grain structure.

2. In a method of welding, welding small end sections of silicon killed carbon-molybdenum steel of normal carbide structure under the McQuaid-Ehn test to the opposite ends of a main body portion of aluminum killed carbon-molybdenum steel of abnormal carbide structure under the McQuaid-Ehn test which constitutes the predominating part of the final product, subjecting the composite product to normalizing heat treatment, and welding such composite products in the field and in such arrangement that the field welding is effected between the silicon killed carbon-molybdenum steel sections, the steps of the method being such that the field welding does not give any of the composite components a predisposition to graphitize.

3. In a method eliminating the graphitization of carbon-molybdenum steel in industrial installations, welding relatively small sections of silicon killed carbon-molybdenum steel (having an aluminum content of less than .005 and a grain size of the order of 1–3, and showing normal in the McQuaid-Ehn test) to marginal parts of a main body portion of aluminum killed carbon-molybdenum steel (showing abnormal in the McQuaid-Ehn test and having a grain size of the order of 7 and 8) which constitutes the predominating part of the final product, subjecting the composite product to normalizing heat treatment, field welding the silicon killed parts of such composite products to other installation components, and stress relieving the welded joints in the field, the steps of the method being such that the field welding does not give any of the composite components a predisposition to graphitize.

4. In a composite tubular product constituting a component of a heat exchange installation operating at high temperatures, a main body portion consisting of an aluminum killed carbon-molybdenum steel which has been indicated as abnormal by the McQuaid-Ehn test, and a relatively small marginal section of a silicon killed carbon-molybdenum steel (of not over .005 aluminum content, of a grain size of the order of 1–3, and showing normal in the McQuaid-Ehn test) joined with a marginal part of said main body portion by a weld, said weld and the main body portion being of normalized grain structure.

5. In a method of welding, welding relatively small marginal sections of silicon killed carbon-molybdenum steel to a main body portion of aluminum killed carbon-molybdenum steel which constitutes the predominating part of the ultimate product, the silicon killed carbon-molybdenum steel containing carbon as well as manganese and molybdenum but having an aluminum content not in excess of .005, said silicon killed carbon-molybdenum steel showing normal under the McQuaid-Ehn test with a grain size from 1 to 3, said aluminum killed carbon-molybdenum steel having an aluminum content in excess of .005 and showing abnormal under the McQuaid-Ehn test, subjecting the composite welded product to a normalizing heat treatment, and then welding such composite products to other installation components in the field in such arrangement that the field welding is effected only between the silicon killed carbon-molybdenum steel sections and other installation components.

6. In a method preventing graphitization in installations including carbon-molybdenum steel components; welding small marginal sections of silicon killed carbon-molybdenum steel to a main body portion of aluminum killed carbon-molybdenum steel; the silicon killed carbon-molybdenum steel showing normal under the McQuaid-Ehn test, having a grain size from 1 to 3, and having an aluminum content not in excess of .005; the aluminum killed carbon-molybdenum steel having an aluminum content in excess of .005, a small grain size of the order of 7 and 8, and showing abnormal under the McQuaid-Ehn test; the above types of carbon-molybdenum steel each having an analysis in which manganese and molybdenum are of the range from .40 to .65, in addition to carbon and silicon; subjecting the composite welded product to a normalizing heat treatment in the shop; field welding the silicon killed carbon-molybdenum steel parts of said composite products to other installation components; and stress-relieving the welded joints in the field.

HOWARD J. KERR.